United States Patent [19]

Opderbeck et al.

[11] Patent Number: 4,796,256
[45] Date of Patent: Jan. 3, 1989

[54] (MPRT) MINI PACKET RECEIVER TRANSMITTER

[75] Inventors: Holger Opderbeck, Herndon, Va.; Gulay Sencer, Red Bank; William N. Carr, Newark, both of N.J.; Steven J. Byars, Chantilly, Va.

[73] Assignee: GTE Communication Systems Corporation, Phoenix, Ariz.

[21] Appl. No.: 908,056

[22] Filed: Sep. 16, 1986

[51] Int. Cl.$^4$ .............................................. H04J 3/02
[52] U.S. Cl. ..................... 370/110.1; 370/29
[58] Field of Search ................. 370/110.1, 58, 29, 99, 370/102, 103; 375/20

[56] References Cited

U.S. PATENT DOCUMENTS

| | | | |
|---|---|---|---|
| 4,603,236 | 7/1986 | Smith et al. | 379/214 |
| 4,627,046 | 12/1986 | Bellamy | 370/58 |
| 4,635,253 | 1/1987 | Urui et al. | 370/84 |
| 4,654,640 | 3/1987 | Carll et al. | 370/58 |

*Primary Examiner*—Douglas W. Olms
*Assistant Examiner*—Melvin Marcelo
*Attorney, Agent, or Firm*—Gregory G. Hendricks

[57] ABSTRACT

The Mini Packet Receiver Transmitter Circuit (MPRT) provides an interface between one or two eight bit microprocessors and a digital subscriber loop interface circuit. The bi-directional communication on a single wire pair is accomplished by alternating the subscriber loop receive and transmit frames controlled by a "Ping-Pong Protocol" using fixed frame format and bipolar alternate mark inversion (AMI) line encoding. There are two microprocessor ports within the MPRT, a transparent port for voice transmission and a non-transparent port for data trasmission. The MPRT implements the Mini Packet Protocol frame format as a mini packet (MP) of information, for both transparent and non-transparent data.

4 Claims, 14 Drawing Sheets

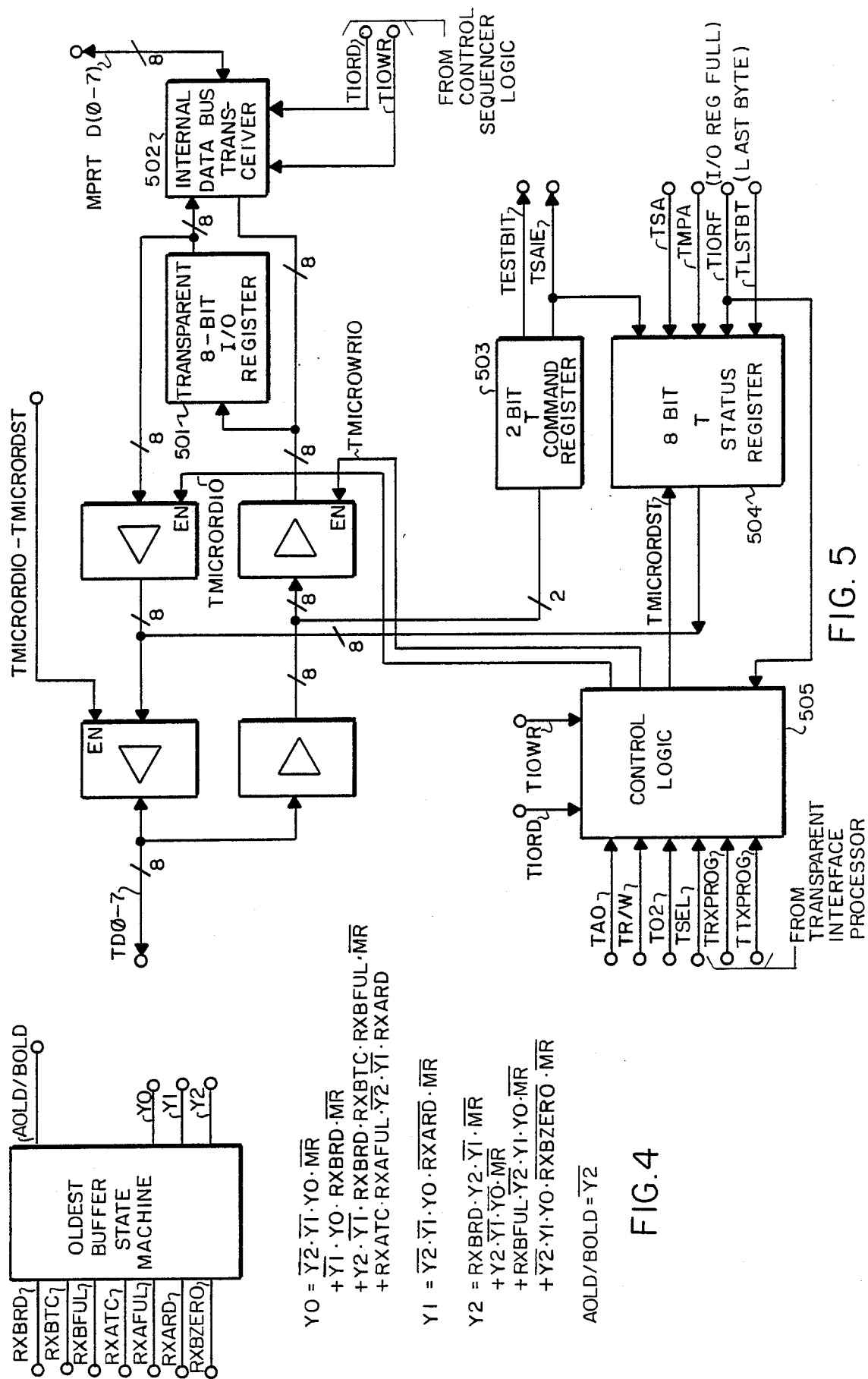

$Y0 = \overline{Y2} \cdot \overline{Y1} \cdot Y0 \cdot \overline{MR}$
$\quad + \overline{Y1} \cdot Y0 \cdot RXBRD \cdot \overline{MR}$
$\quad + Y2 \cdot \overline{Y1} \cdot RXBRD \cdot RXBTC \cdot RXBFUL \cdot \overline{MR}$
$\quad + RXATC \cdot RXAFUL \cdot \overline{Y2} \cdot \overline{Y1} \cdot RXARD$ $Y1 = \overline{Y2} \cdot \overline{Y1} \cdot Y0 \cdot \overline{RXARD} \cdot \overline{MR}$ $Y2 = RXBRD \cdot Y2 \cdot \overline{Y1} \cdot \overline{MR}$
$\quad + Y2 \cdot \overline{Y1} \cdot \overline{Y0} \cdot \overline{MR}$
$\quad + RXBFUL \cdot \overline{Y2} \cdot Y1 \cdot Y0 \cdot \overline{MR}$
$\quad + \overline{Y2} \cdot Y1 \cdot Y0 \cdot RXBZERO \cdot \overline{MR}$ $AOLD/\overline{BOLD} = \overline{Y2}$

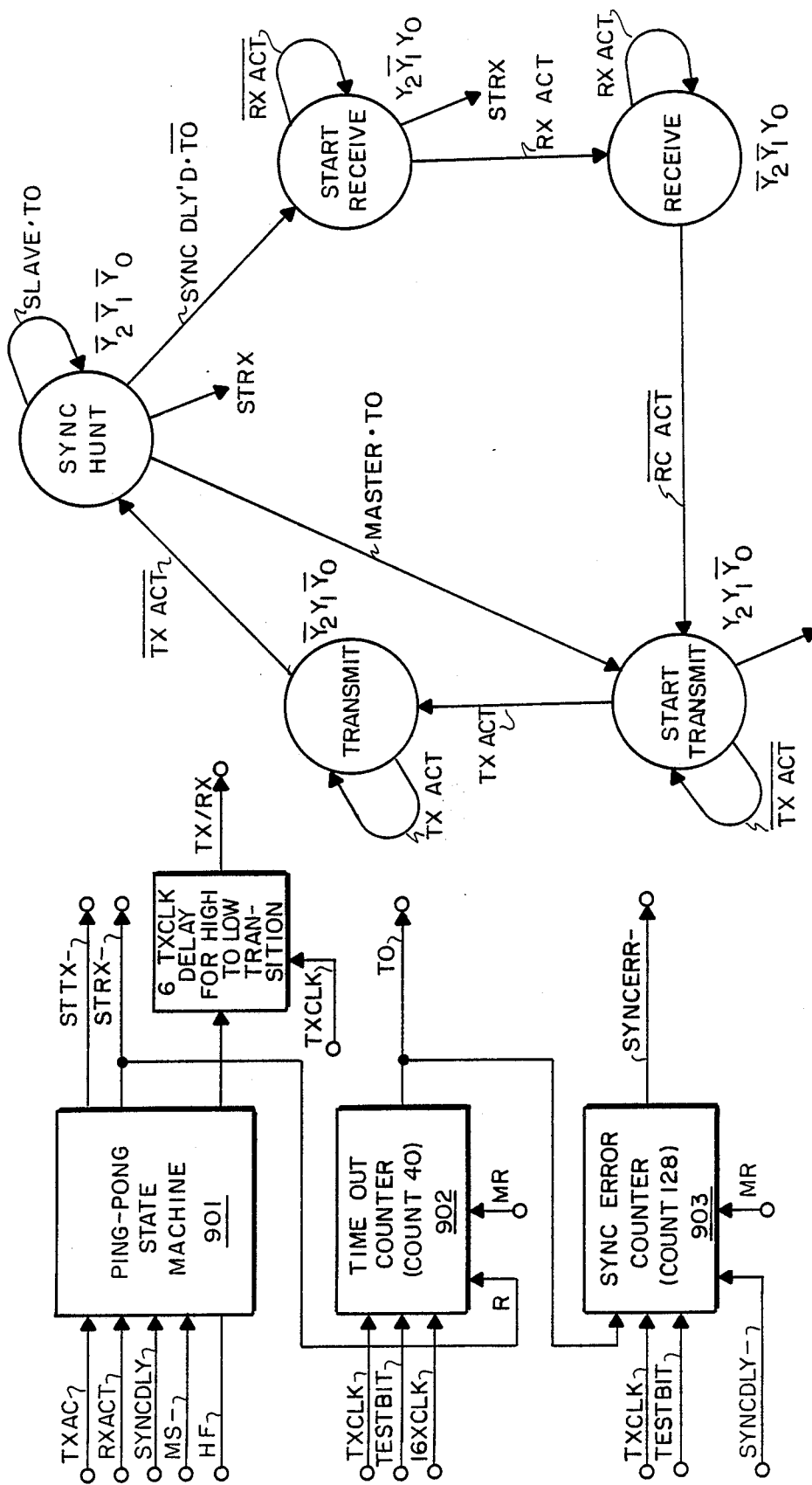

$$Y0 = Y2 \cdot \overline{Y1} \cdot Y0 \cdot \overline{MR}$$
$$+ \overline{Y1} \cdot Y0 \cdot RXACT \cdot \overline{MR}$$
$$+ Y2 \cdot Y1 \cdot Y0 \cdot SYNCDLY \cdot \overline{TO} \cdot \overline{MR}$$

$$Y1 = Y2 \cdot Y1 \cdot \overline{Y0} \cdot \overline{MR}$$
$$+ Y1 \cdot \overline{Y0} \cdot TXACT \cdot \overline{MR}$$
$$+ \overline{Y2} \cdot Y1 \cdot Y0 \cdot \overline{RXACT} \cdot \overline{MR}$$
$$+ Y2 \cdot Y1 \cdot Y0 \cdot MS \cdot \overline{TO} \cdot \overline{MR}$$

$$Y2 = \overline{Y2} \cdot Y1 \cdot Y0 \cdot MS \cdot \overline{TO} \cdot \overline{MR}$$
$$+ \overline{Y2} \cdot Y1 \cdot Y0 \cdot SYNCDLY \cdot \overline{TO} \cdot \overline{MR}$$
$$+ Y1 \cdot Y0 \cdot \overline{RXACT} \cdot \overline{MR}$$
$$+ Y2 \cdot Y1 \cdot \overline{Y0} \cdot TXACT \cdot \overline{MR}$$

FIG. 11

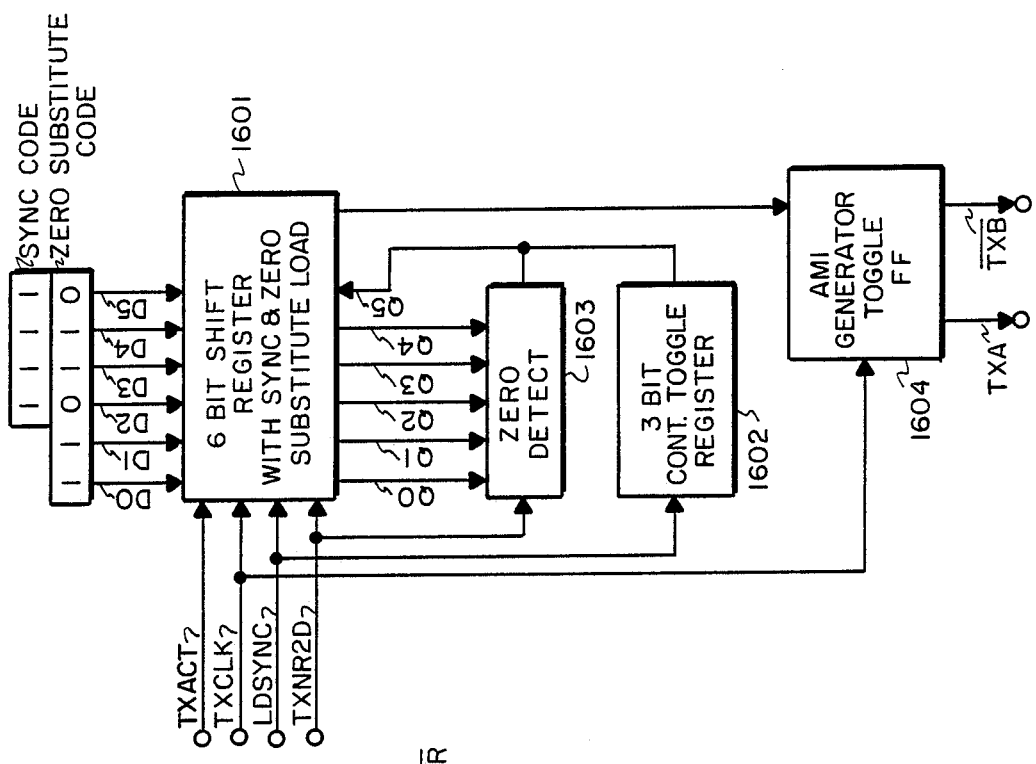

FIG. 16

$Y0 = \overline{Y2} \cdot Y1 \cdot Y0 \cdot \overline{MR}$
$\quad + RXACT \cdot (Y0+Y1) \cdot \overline{MR}$
$\quad + \overline{Y0} \cdot \overline{Y1} \cdot Y2 \cdot AEMPTY \cdot SYNCWD \cdot SYNCWOD \cdot (\overline{T0}+\overline{MS}) \cdot \overline{MR}$ $Y1 = \overline{Y0} \cdot \overline{Y1} \cdot Y2 \cdot (\overline{T0}+\overline{MS}) \cdot (SYNCWD+SYNCOD) \cdot \overline{MR}$
$\quad + \overline{RXACT} \cdot Y1 \cdot (\overline{Y0}+\overline{Y2}) \cdot \overline{MR}$
$\quad + \overline{Y0} \cdot Y1 \cdot Y2 \cdot \overline{MR}$ $Y2 = STRX \cdot \overline{Y0} \cdot \overline{Y1} \cdot \overline{Y2} \cdot \overline{MR}$
$\quad + Y2 \cdot \overline{Y1} \cdot Y0 \cdot SYNCWOD \cdot (\overline{T0}+\overline{MS}) \cdot (\overline{SYNCWD}+AEMPTY \cdot BEMPTY) \cdot \overline{MR}$
$\quad + \overline{RXACT} \cdot (Y1 \cdot \overline{Y2}+Y0 \cdot Y2) \cdot \overline{MR}$
$\quad + \overline{RXACT} \cdot Y2 \cdot Y1 \cdot \overline{Y0} \cdot \overline{MR}$ BUFAENB = $Y0 \cdot \overline{Y1} \cdot Y2$ BUFBENB = $Y0 \cdot \overline{Y1} \cdot Y2$ FFAWR = BUFAENB·WRPULSE
ACNTRWR = FFAWR·$\overline{CRCTIME}$·WRPULSEDLY  } A WR CONTROL FFBWR = BUFBENB·WRPULSE
BCNTRWR = FFBWR·$\overline{CRCTIME}$·WRPULSEDLY  } B WR CONTROL RX0XRN PULSE = $\overline{AEMPTY}$·BEMPTY·SYNCWD·$Y2 \cdot \overline{Y1} \cdot \overline{Y0}$·16XCLK

FIG. 15

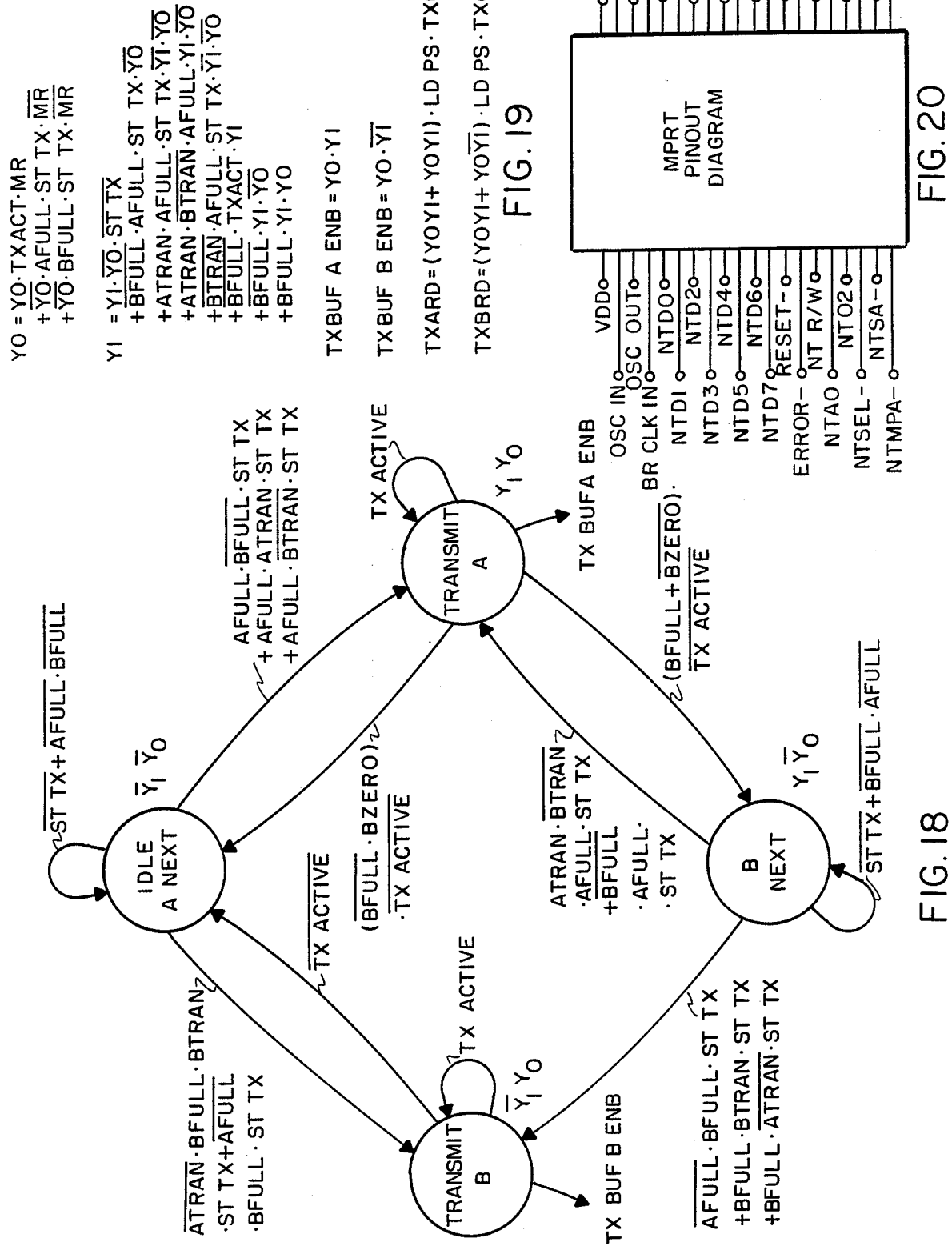

(MPRT) MINI PACKET RECEIVER TRANSMITTER

CROSS REFERENCE TO RELATED APPLICATIONS

The following applications filed on even date herewith and assigned to the same assignee disclose aspects pertinent to the present application and are hereby incorporated as if fully disclosed herein:

Packet Bus Interface, application Ser. No. 906,055 in the name of Steven Byars and William Carr;

Synchronous Packet Manager, application Ser. No. 908,112, in the name of William W. Finch and Gulay Sencer;

Asynchronous Packet Manager, application Ser. No. 908,111 in the name of William. W. Finch and Gulay Sencer; and Voice Packet Assembler Disassembler, application Ser. No. 908,076 in the name of Gary Schlecte and John Csapo.

BACKGROUND OF THE INVENTION

The Mini Packet Receiver Transmitter (MPRT) of the present invention provides an interface between one or two 8-bit microprocessors and a digital subscriber loop interface or line driver circuit.

Digital interface circuits are known as disclosed in the U.S. Pat. Nos. 4,493,092 and 4,507,793 both of which issued on Dec. 17, 1982 to Tello D. Adams. Also known is a more basic cersion of a minipacket receive and transmit circuit as disclosed in U.S. Pat. No. 4,603,236 which issued on July 29, 1986, respectively, to Janos I. Csapo.

However, the present invention discloses a novel means of implementing a Mini Packet Receiver Transmitter utilizing a ping-pong protocol for transmission of information over a digital line.

SUMMARY OF THE INVENTION

In accordance with the present invention a transmitter-receiver circuit is provided for use in a communication system that includes at least one microprocessor and a digital subscriber loop circuit, each operated to send and receive digital information. The transmitter-receiver circuit is connected between the digital subscriber line circuit and said one or more microprocessors.

The transmitter-receiver circuit is operated to transmit alternating send and receive frames of said information of predetermined size between the digital subscriber line circuit and said one or more microprocessors, whereby the transmitter-receiver circuit transmits the alternating send and receive frames in a ping-pong protocol.

DESCRIPTION OF THE DRAWING

FIG. 4 of the accompanying drawing is a logic equation of the Oldest Buffer State Machine of FIG. 2;

FIG. 5 of the accompanying drawing is a block diagram of the Transparent I/O Register of FIG. 1;

FIG. 9 of the accompanying drawing is a block diagram of the Ping-Pong Sequencer of FIG. 1;

FIG. 10 of the accompanying drawing is a state diagram of the Ping-Pong Sequencer of FIG. 1;

FIG. 11 of the accompanying drawing is a logic equation diagram of the Ping-Pong Sequencer of FIG. 1;

FIG. 15 of the accompanying drawing is a logic equation diagram of the RX Frame Processor of FIG. 1;

FIG. 16 of the accompanying drawing is a block diagram of the TX Bit Processor of FIG. 1;

FIG. 18 of the accompanying drawing is a state diagram of the TX Frame Processor of FIG. 1;

FIG. 19 of the accompanying drawing is a logic equation diagram of the TX Frame Processor of FIG. 1; and FIG. 20 of the accompanying drawing is a pinout diagram of the MPRT of the present invention.

DESCRIPTION OF THE PREFERRED EMBODIMENT

The MPRT is an LSI circuit which provides an interface between one or two eight bit microprocessors and a digital subscriber loop interface (Line Drive) circuit. The Line Driver and MPRT circuit can be used for both 2-wire and 4-wire systems. The signal is transmitted over the loop in bipolar alternate mark inversion (AMI) return to zero (RZ) format. The bit rate can be from 4KBPS to 256KBPS. The bi-directional communication on a single twisted wire pair is accomplished by alternating the subscriber loop transmit and receive frames. Each alternating transmit and receive frame is transmitted in a half duplex burst mode transmission scheme usually referred to as ping-pong protocol under the control of the MPRT circuit.

There are two microprocessor ports within an MPRT circuit: a transparent port for voice transmission and a non-transparent port for data transmission. The MPRT implements a Mini Packet Protocol frame format, referred to as mini-packet (MP), for both transparent and non-transparent data.

The sync character is four bits in length and distinguishes between fill (non-information) frames and information frames. Fill frames are sent as all zeros. The information field consists of ten or twelve octets of data. The check character is an eight-bit CRC.

The CRC generator polynominal is $X^8 + X^7 + X^2 + 1$.

The data in the information field is send least significant bit (LSB) first. CRC is send most significant bit (MSB) first.

CODING METHOD

The signal is transmitted over the receive loop in bipolar AMI return to zero (RZ) format with 50% duty cycle. The consecutive ones, on the loop, are represented as positive and negative pulses. To generate three level bipolar AMI code two signals are required. Therefore, the MPRT chip provides two serial receive inputs RXA, RXB and two serial send outputs TXA, TXB.

The information field and CRC character are encoded using Bipolar Six Zero substitution (B6ZS) coding. B6ZS encoding substitutes a recongnizable pattern with two bipolar rule violations for groups of six zeros.

Figure 1:
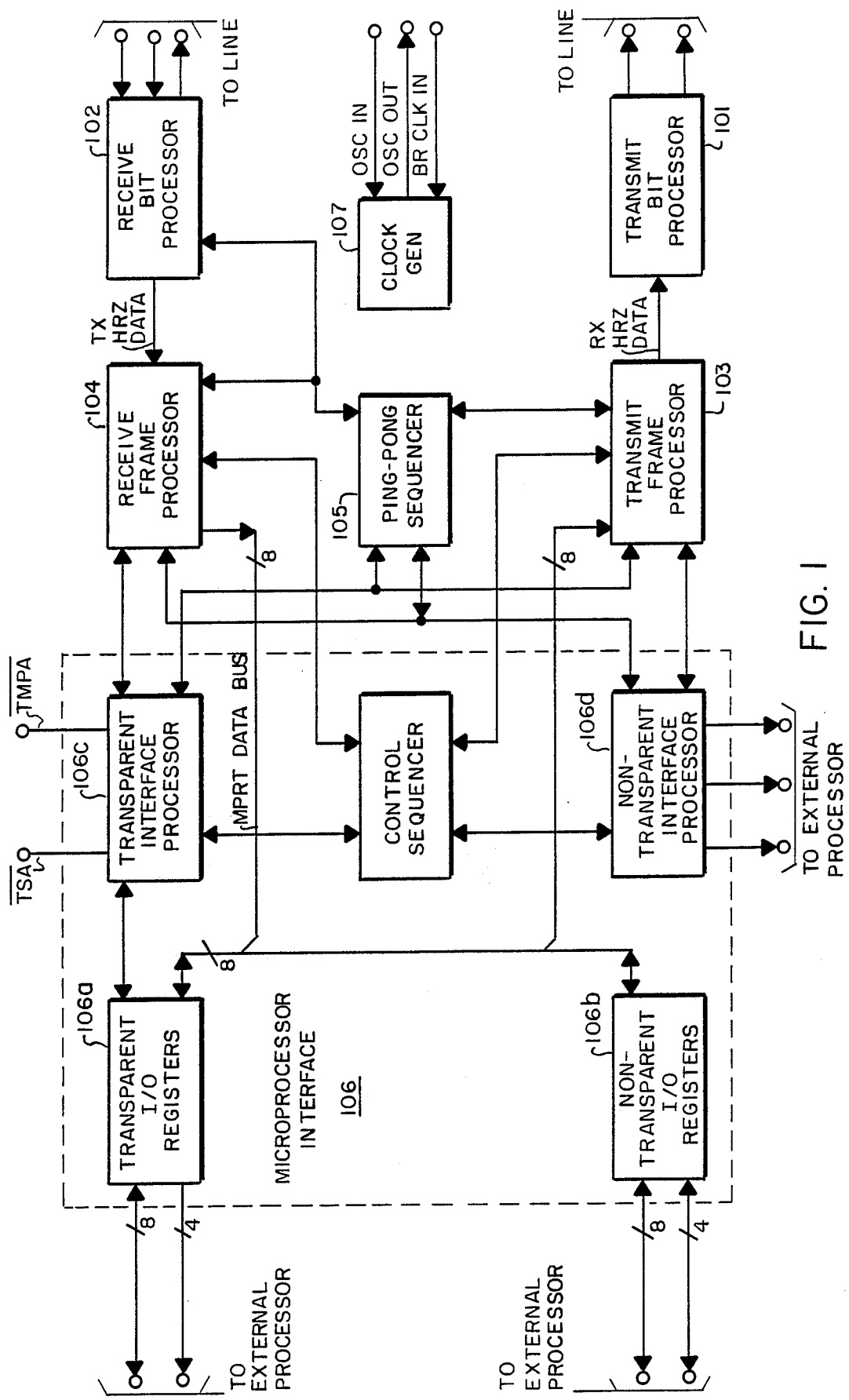
FIG. 1 of the accompanying drawing is a block diagram of the Mini Packet Receiver Transmitter (MPRT) of the present invention.

Referring now to FIG. 1 a block diagram of the MPRT is shown. The primary functions performed by the MPRT are to receive and transmit asynchronous mini-packets from and to the subscriber communication loop and to control the transfer of these mini-packets to and from the microprocessors. An MPRT can be divided into seven sub-circuits. The Transmit and Receive Bit Processors convert between B6ZS and NRZ data coding and recognize and generate sync characters. A receive clock is extracted or recovered from the receive asynchronous data in the Receive Bit Processor. The Transmit and Receive Frame Processors 103 and 104, respectively each include two mini-packet storage buffers, shift registers for serial/parallel conversion, Cyclic Redundancy Check (CRC) generation/checking logic and a control sequencer. The Ping-Pong controller controls the alternation of receive and transmit mini-packet frames. The Microprocessor Interface contains the Transparent and Non-transparent I/O data registers 106a and 106b, respectively, registers, status registers and a control sequencer 107 which reads and writes from and to the storage buffers of the Transmit and Receive Frame Processor.

The Microprocessor Interface 106 controls the transfer of minipackets between the MPRT 1 Transmit 1 Receive storage buffers and of the associated Frame Processors 103 and 104 and the Transparent/Non-Transparent microprocessors 106c and 106d respectively. There are two transmit buffers TXA and TXB, and two receive buffers, RXA and RXB in each Frame Processor. Each buffer can store one complete mini-packet; Transparent (voice) and Non-Transparent (data). Transparent minipackets are identified by a "1" in the MSB of the first octet in the information field. The MPRT contains two eight-bit microprocessor ports.

Figure 2:
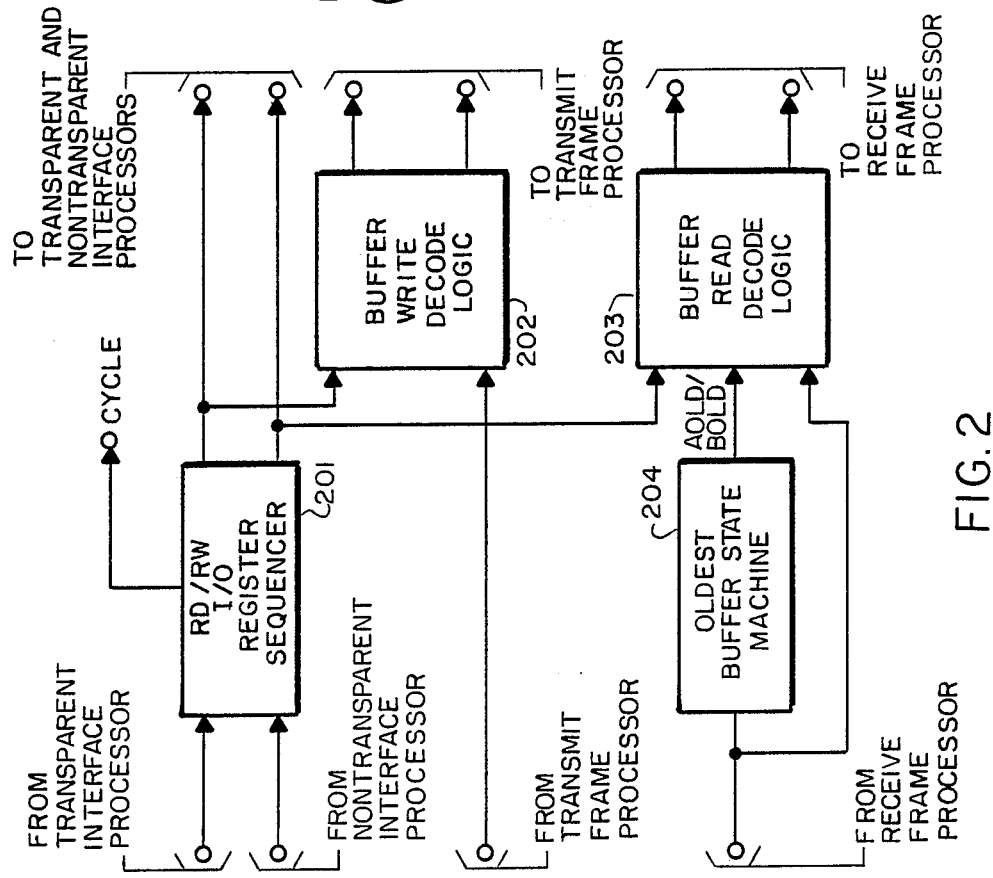
FIG. 2 of the accompanying drawing is a block diagram of the Control Sequencer of FIG. 1.

Referring now to FIG. 2, the control Sequencer of the present invention is shown.

It consists of four sections; The RD/RW I/O Register Sequencer 201, the Write Buffer Decode logic 202, the Read Buffer Decode logic 203, and Oldest Buffer state machine 204. The Control Sequencer generates read and write signals for each octet of the mini-packet that is being transferred.

RD/WR I/O Register Sequencer decodes the I/O requests and generates the required I/O register read or write signal to TNT transparent and Non-Transparent Interface Processor. Read Buffer decode logic 203 decodes the receive buffer status and I/O register write signals to generate receive buffer read signals. Write Buffer decode logic 202 decodes the transmit buffer status and I/O register read signals to generate the transmit buffer write signals. Oldest Buffer State Machine 204 keeps track of which receive storage buffer is the oldest.

RD/WR I/O Register Sequencer 201 initiates Reads or Writes of the Transparent or Non-Transparent I/O Register groups in a prioritized manner. The priority from highest to lowest is: Transparent Receive, Transparent Transmit, Non-Transparent Receive, and Non-Transparent Transmit. Only one I/O request is serviced at a time on the MPRT Data Bus. The I/O requests are serviced as follows:

Transparent receive; The transparent interface processor is in the receive in progress state and the Transparent I/O register is empty. The control sequencer reads an octet from the oldest transparent receive buffer and writes it into the Transparent I/O Register.

Transparent transmit; The transparent interface processor is in the transmit in progress state and the Transparent I/O Register is full. The control sequencer reads an octet from the Transparent I/O Register and writes it to a transmit buffer in the transparent interface processor.

Non-Transparent receive; The Non-Transparent interface processor is in the receive in progress state and Non-Transparent I/O Register is empty. The control sequencer reads an octet from the oldest Non-Transparent receive buffer of the Non-Transparent interface processor and writes it into the Non-Transparent I/O Register.

Non-Transparent transmit; The Non-Transparent interface processor is in the transmit in progress state and the Non-Transparent I/O Register is full. The control sequencer sequencer reads an octet from the Non-Transparent I/O Register and writes it to a transmit buffer of the Non-Transparent interface processor.

The write buffer decode logic decides which transmit TX storage buffer is to be written into according to the following rules.
1. The TX storage buffer must be empty and its counter at zero (free) for the control sequencer to write the first byte or a minipacket to it.
2. If both TX storage buffers are free, write to TXA storage buffer.
3. When a microprocessor begins writing to a TX storage buffer, that buffer is considered "in use". A buffer can be in use for the Transparent or Non-Transparent microprocessor. After the first byte has been written from one interface all subsequent writes from that interface processor will be directed to the buffer which that interface is using.

The read buffer decode logic decides which receive (RX) processor storage buffer the microprocessor will read according to the following rules:
1. RX storage buffer must be full.
2. RX storage buffers full of transparent frames always go to the transparent Interface processor.
3. RX storage buffers full of Non-Transparent data go to the Non-Transparent interface processor if the data only mode is not set. If the data only mode is set, they go to the transparent interface processor.
4. If both RX storage buffers are full with different types of data, the storage buffer full of transparent data is read first.
5. If only one RX buffer is full and a data transfer has been requested, it is read.
6. If both RX storage buffers are full of the same type of information, transparent or non-transparent frames, the oldest buffer is read first.

The Oldest Buffer State machine keeps track of which RX storage buffer contains the oldest information. The read decode logic uses the oldest RX storage buffer when both buffers are full of the same type of information. The read decode logic uses the oldest RX storage buffer when both buffers are full of the same type of information.

Figure 3:
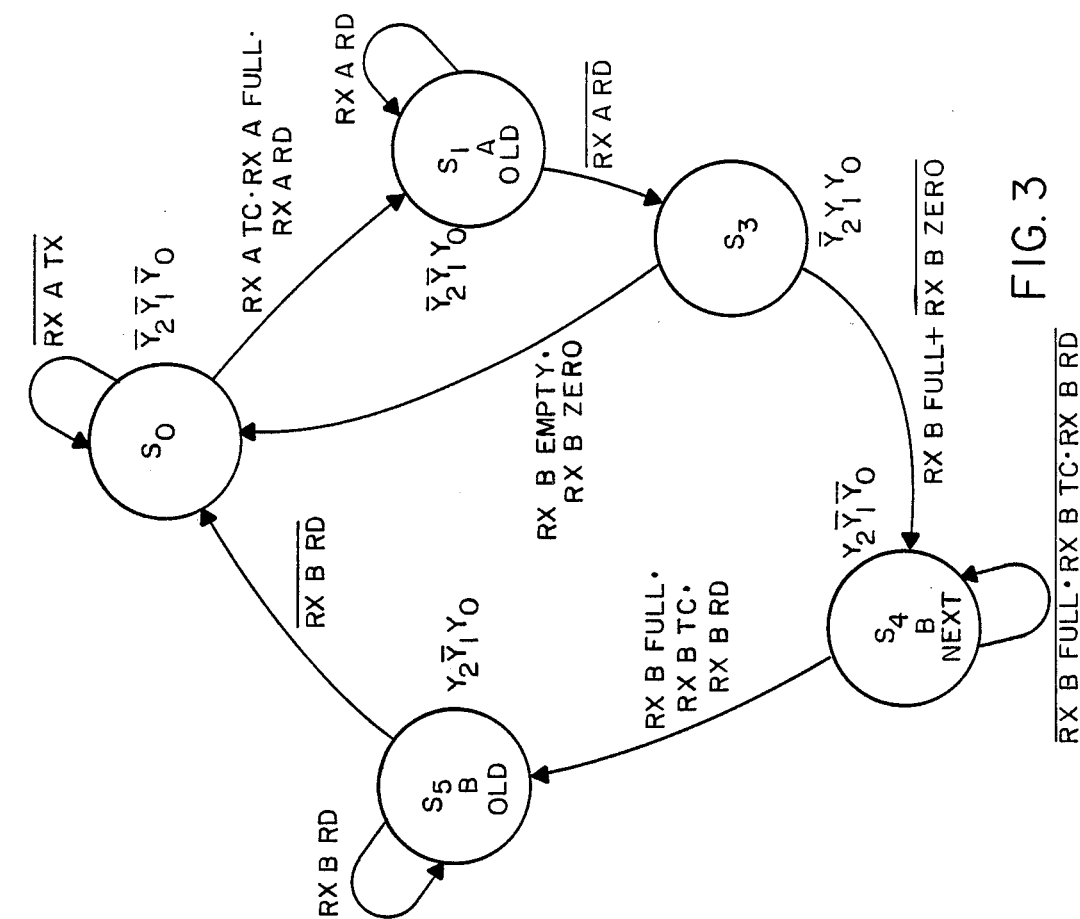
FIG. 3 of the accompanying drawing is a state diagram of the Oldest Buffer State Machine of FIG. 2.

A state diagram defining the logic of the Oldest Buffer State Machine is shown in FIG. 3. Also, the corresponding logic equations defining the Oldest Buffer State Machine are shown in FIG. 4.

Referring now to FIG. 5, the Transparent I/O Register is shown. This circuit provides the connection between the transparent interface data but and internal MPRT data bus. Minipacket transfers between the MPRT storage buffers and the transparent interface are transferred asynchronously one octet at a time, controlled by handshake. The Transparent I/O Register contains 8-bit bi-directional I/O Register 501, Internal data bus transceiver 502, Command Register 503, Status Register 504, and control logic 505. The Transparent Address bit TAO and Read/Write TR/$\overline{W}$ input pins select which function is to be performed by the register. These functions are defined in the following table.

| TAO | TR/$\overline{W}$ | Function |
|---|---|---|
| 0 | 0 | Write octet into I/O Reg |
| 0 | 1 | Read octets from I/O Reg |
| 1 | 0 | Write Control Reg |
| 1 | 1 | Read Status Reg |

The bit and pattern layout for the Transparent Registers is shown below for data, write and read functions.

| TRANSPARENT DATA REGISTER | | | | | | | |
|---|---|---|---|---|---|---|---|
| B7 | B6 | B5 | B4 | B3 | B2 | B1 | B0 |
| D7 | D6 | D5 | D4 | D3 | D2 | D1 | D0 |
| TRANSPARENT COMMAND REGISTER (WRITE | | | | | | | |
| B7 | B6 | B5 | B4 | B3 | B2 | B1 | B0 |
| SA INT EN SAIE | | | | | | | TB |

Space Available Interrupt Enable SAIE. A one in this bit will enable space available interrupt. (See SA bit in TRANSPARENT Status Register)

NOTE: The SA bit in the status register indicates the state of the TRANSPARENT Space Available interrupt output pin of the MPRT.

TB Test bit—This bit must be a zero for correct operation of the MPRT.

| TRANSPARENT PORT STATUS REGISTER (READ) | | | | | | | |
|---|---|---|---|---|---|---|---|
| B7 | B6 | B5 | B4 | B3 | B2 | B1 | B0 |
| LAST BYTE | I/O REG FULL | | MPA | SA | | | SAIE TX INT END |
| STATUS REGISTER BIT DEFINITIONS | | | | | | | |

| | |
|---|---|
| LAST BYTE | This bit is set to a one after the last byte of a packet is read from or written to the MPRT Data Register. It is reset by the next read or write or the MPRT Data Register. |
| I/O REG FULL | This bit will be a one when the MPRT Data Register contains a data byte. It can be used as a data available flag for receive operations, and a not ready flag for transmit operations. |
| MPA (MINIPACKET AVAILABLE) | This bit will be a one when Space Available is not asserted (see SA) and a receive packet is available. It is reset on the read of the first data byte of the received packet. |
| SA (SPACE AVAILABLE) | This bit will be a one when there is an empty buffer available and Space Available INTerrupt Enable is set and MiniPacket Available is not asserted. It is reset either when the Space Available INTerrupt Enable is reset or the first byte of a packet is written to the TRANSPARENT Data Register. |
| TX INTEN SAIE | This bit will be a one if SAIE of the Command Register is set, otherwise it will be zero. |

Figure 6:
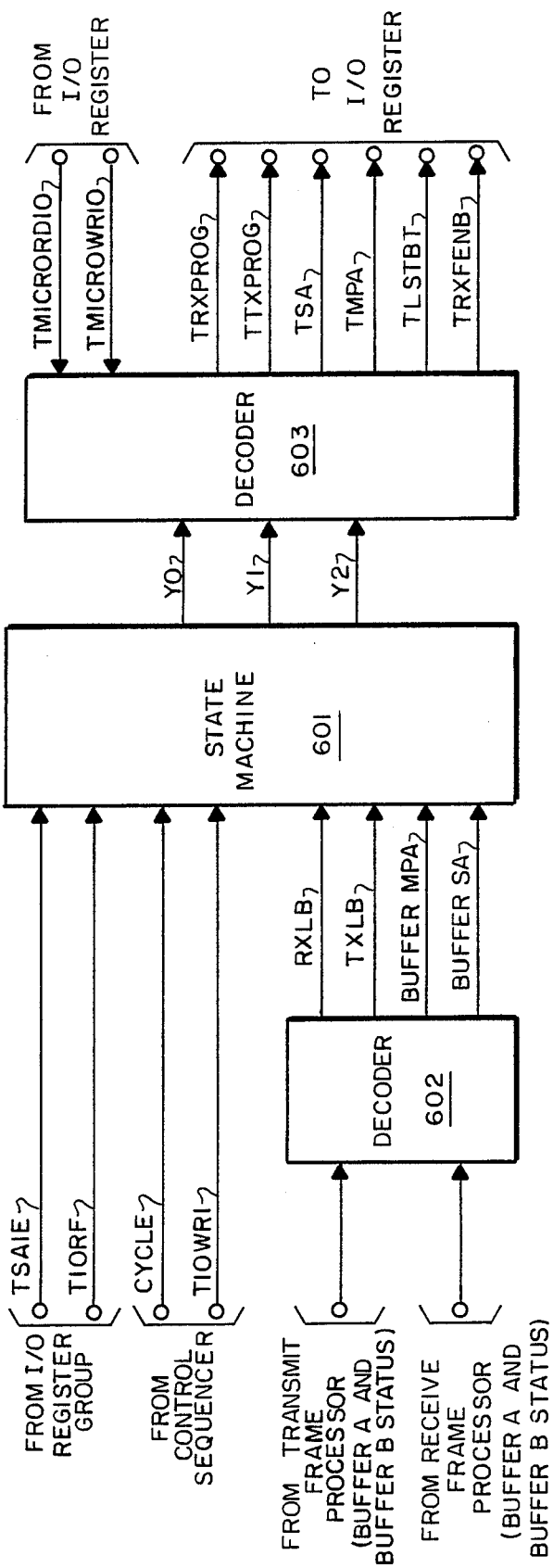
FIG. 6 of the accompanying drawing is a block diagram of the Transparent Interface Processor of FIG. 1.

Referring now to FIG. 6, the Transparent Interface Processor of the present invention is shown. This processor monitors the minipacket transfers and performs the minipacket level control function. This processor has three modes of operation; idle, receive and transmit. In the receive mode, a minipacket is transferred from the RX buffer to the transparent I/O Reg. In the transmit mode, a minipacket is transferred from the transparent I/O Reg to a TX buffer. When the machine enters a receive or transmit mode (only one mode at a time), a complete minipacket is transferred before returning to the idle state. The transparent interface is not allowed to receive and transmit simultaneously.

The receive mode is entered when a receiver storage buffer full of transparent data is available in one of the receive frame processor storage buffer, buffer minipacket available (MPA). The first octet of the minipacket is written in the transparent I/O Reg. setting the I/) Reg. full flag. The State Machine 601, which is connected between decoders 602 and 603, will then output the TMPA signal (TMPA output pin), setting the transmit MPA (TMPA) flag in the transparent status Reg. When the transparent interface processor reads the I/O Reg. the I/O Reg. full flag is reset. The transfer of minipacket octets continue until the transparent interface processor has read the last octet of the minipacket from the I/O Reg. The I/O Reg. full flag is then reset and the last byte flag in the transparent status reg. is set. The microprocessor can then verify that the minipacket transfer is complete by checking the last byte flag in the status reg.

The transmit pending state is entered when there is space available in one of the transmit storage buffers, no minipacket available in the RX buffer, and transparent transmit interrupt enable is set. In the transmit pending state, space available (SA) signal (Space Available output pin) is output to the transparent interface processor. In the transmit pending state, if the transmit interrupt enable is reset, the state machine returns to the idle state. If the state machine is in the transmit pending state and the transparent interface processor write an octet into the I/O Reg., a complete minipacket must be transferred into the MPRT. The last byte flag in the transparent status reg. is set when the last byte of the minipacket has been written into the transmit buffer. The State Machine then returns to the idle state.

Figure 7:
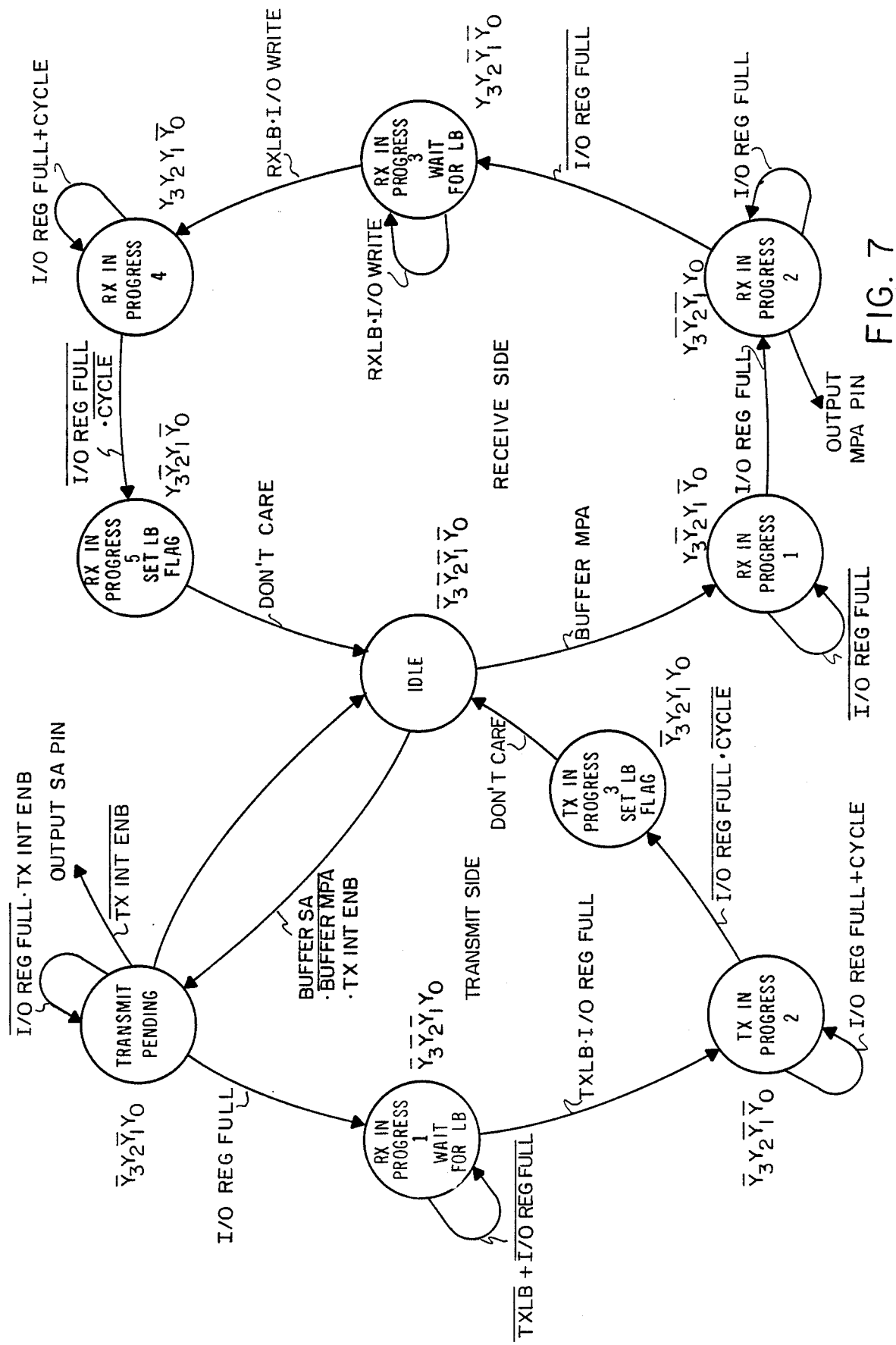
FIG. 7 of the accompanying drawing is a state diagram of the Transparent Interface Processor of FIG. 1.

The state diagram for State Machine 601 is shown in FIG. 7.

Figure 8:
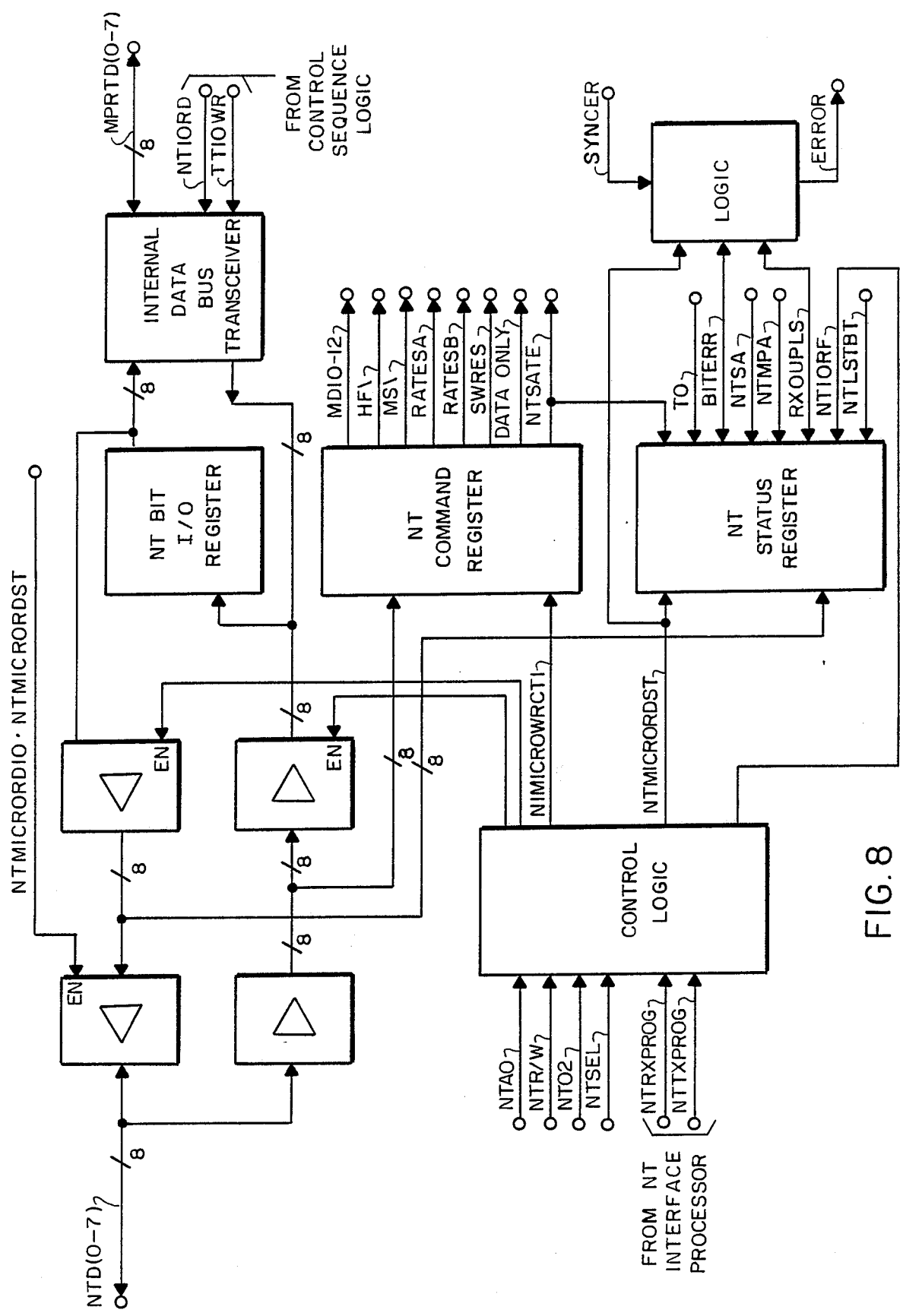
FIG. 8 of the accompanying drawing is a block diagram of the Non-Transparent I/O Register of FIG. 1.

Referring now to FIG. 8, the circuit of the Non-Transparent Register 106b is shown. This circuit is identical to the Transparent Register Circuit 106a except for the Status and Command Registers. The bit pattern formats for the data, Command Write Register and Status (read) Register the bits are shown below.

NON-TRANSPARENT DATA REGISTER

| B7 | B6 | B5 | B4 | B3 | B2 | B1 | B0 |
|----|----|----|----|----|----|----|----|
| D7 | D6 | D5 | D4 | D3 | D2 | D1 | D0 |

NON-TRANSPARENT Command Register (Write)

| B7 | B6 | B5 | B4 | B3 | B2 | B1 | B0 |
|------|----|-------|-----|-----|-----|-----|-------|
| SAID | Do | SWRST | RSA | RSB | M/S | H/F | 10/12 |

| | |
|---|---|
| SAID | Space Available Interrupt Enable - A one in this bit will enable space available interrupts. (see SA bit in NONTRANSPARENT Status Register) Note: The SA bit in the status register indicates the state of the NONTRANSPARENT Space Available interrupt out put pin of the MPRT. |
| DO—DATA ONLY | When this bit is set to a one all receive packets will be routed to the transparent port. |
| SWRST | Software Reset - When this bit is set to a zero the MPRT will be reset. |
| RSA, RSB—RATE SEL A, RATE SEL B | These bits select the divisor for generating the baud rate clock from the baud rate clock input pin or the MPRT. |

| RSA | RSB | Data Rate |
|-----|-----|-----------|
| 0 | 0 | 256 KB/S |
| 0 | 1 | 64 KB/S |
| 1 | 0 | 16 KB/S |
| 1 | 1 | 4 KB/S |

| | |
|---|---|
| M/S—MASTER SLAVE | When this bit is a one (Master mode) the MPRT will respond to missing sync characters (40 bit times waiting for a sync character) by transmitting a packet. In slave mode the MPRT will continue to wait for a sync character. This bit has no effect in full duplex mode. |
| H/F—FULL/HALF DUPLEX | When this bit is a zero the receiver and transmitter operate independently. In the half duplex mode the transmitter and receiver alternate frames. |
| 12/10—TWELVE/TEN | When this bit is a one the MPRT will transmit and receive packets consiting of 12 bytes of data. In ten byte mode packets consists of 10 bytes of data. |

NONTRANSPARENT Status Register (Read)

| B7 | B6 | B5 | B4 | B3 | B2 | B1 | B0 |
|----|------|-------|-----|----|----|----|------|
| LB | I/ORF | RXOVE | MPA | SA | BE | TO | SAIE |

| | |
|---|---|
| LB—LAST BYTE | This bit is set to a one after the last byte of a packet is read from or written to the MPRT Data Register. It is reset by the next read or write of the MPRT Data Register. |
| I/ORF—I/O REG FULL | This bit will be a one when the MPRT Data Register contains a data byte. It can be used as a data available flag for receive operations, and a not ready flag for transmit operation. |
| RXOV—Receive Overrun Error | This bit will be set to a one when the MPRT receives a packet and both receive buffers are full. This bit is reset by reading the status register. |
| MPA—MINIPACKET AVAILABLE | This bit will be a one when Space Available is not asserted (see SA) and a receive packet is available. It is reset on the read of the first data tyte of the received packet. |
| SA—SPACE AVAILABLE | This bit will be a one when there is an empty buffer available for the nontransparent interface Space Available Interrupt Enable is set, and MiniPacket Available is not asserted. It is reset either when the Space Available Interrupt Enable is reset or the first Byte of a packet is written to the NONTRANSPARENT Data register. |
| BE—BIT ERROR | This bit will be set to a one when either a CRC error occurs or an illegal input pulse is detected. It is reset by a nontransparent status read. |
| TO—TIME OUT | This bit will be set to a one after 40 bit times waiting without detecting a sync character. It is rest by a non-transparent status read. |
| SAIE—SPACE AVAILABLE INTERRUPT ENABLE | This bit will be done if space available interrupt is enabled. |

The Non-Transparent Interface processor is the same as the Transparent Interface processor.

Referring now to FIG. 9, the Ping-Pong Controller of the present invention is shown. This controller contains state machine 901 to control the alternation of subscriber loop receive and transmit frames, divide by 40 sync character time out counter 902, and divide by 128 sync error counter 903.

The Ping-Pong Controller operates in one of three modes:
1. Full Duplex
2. MASTER (Half Duplex)
3. SLAVE (Half Duplex)

In the Full Duplex Mode, Start Transmit (ST TX) is initiated after Transmit Active (TX ACT) goes low or inactive for at least one Transmit Clock (TX CLK) period and Start Receive (ST RX) is initiated when Receive Active (RX ACT) goes low or inactive. This set of conditions will cause the Receive/Transmit bit and Frame Processors to operate continuously.

The Master and Slave modes are used for two way alternate Receive/Transmit communications. When in Half Duplex mode, the state machine controls the ST RX and ST TX signals. For both modes the time out counter is started when ST RX is initiated and the state machine is in the look for sync (Sync Hunt) state. If a sync character has not been found after 40 times, a time out will occur and the Sync error counter is incremented by the TX clock. When in the Master mode and a synchronization error has occured, the sync error counter is incremented, the state machine advances to the ST TX state, and the time out is reset. When in the Slave mode and a synchronization error has occurred, the sync error counter is incremented, the state machine remains in the Sync Hunt state, and the time out counter is not rest. In the Master mode, if 128 TO occur before a sync character is detected, ERROR output pin is reset to low. In the Slave mode, ERROR output pin is reset to low, if a sync character is not detected for a consecutive 512 TXCLK periods.

The state diagram defining the operation of the Ping-Pong controller is shown in FIG. 10. The Ping-Pong timing is asynchronous with the interface processors.

The equations which also define the operation of the Ping-Pong Controller are shown in FIG. 11.

Figure 12:
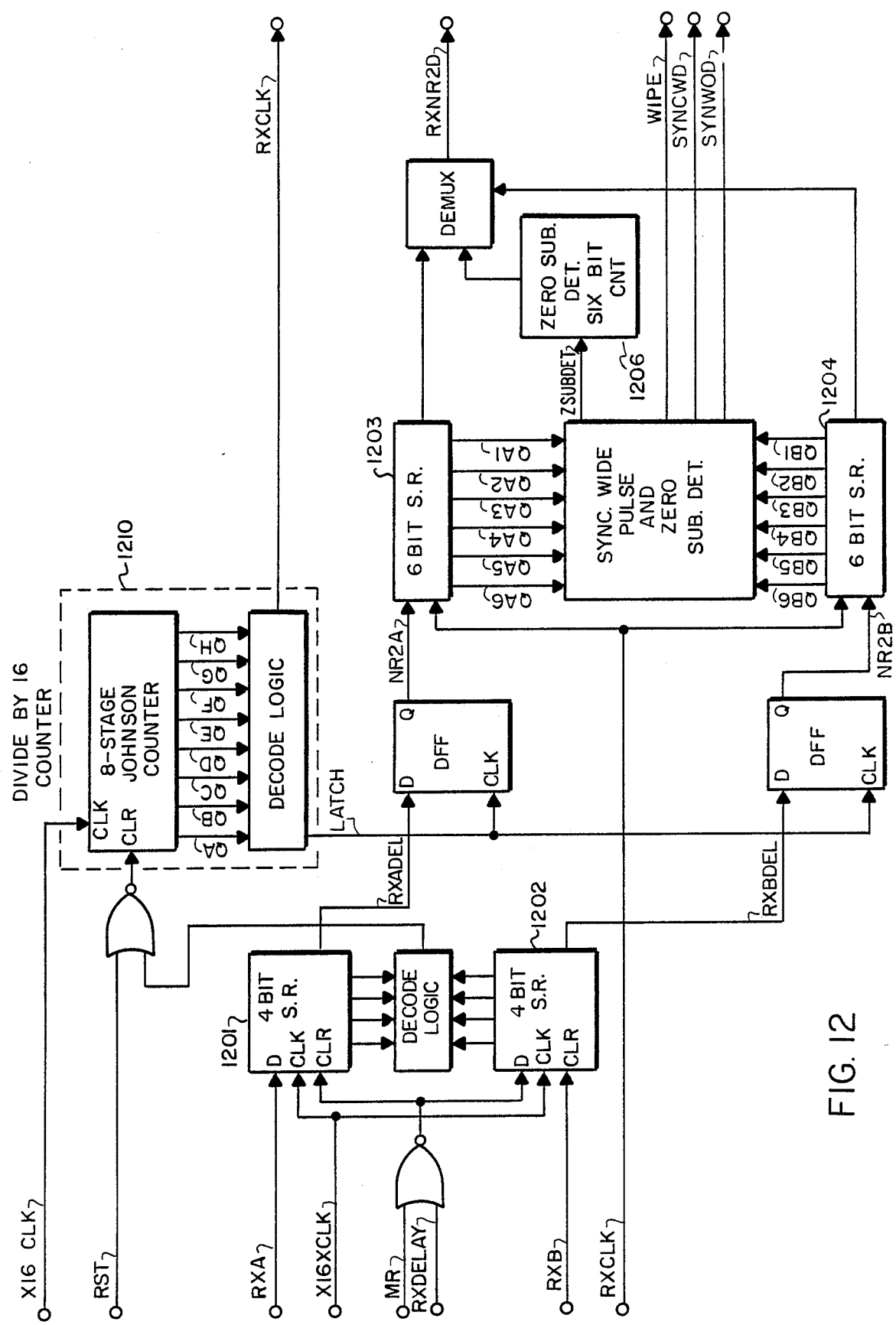
FIG. 12 of the accompanying drawing is a block diagram of the RX Bit Processor of FIG. 1.

Referring now to FIG. 12, the receive bit processor of the present invention is shown. This processor receives the serial input minipacket data, extracts the Receiver Clock signal (RX CLK), detects the sync character, wide pulses, decodes the B6ZS and generates RX NRZ data.

Since two TTL input signals are required to represent B6ZS data, the serial line inputs RXA and RXB must be processed separately until B6ZS data is decoded. Therefore, each serial data input signal requires a 4 bit delay shift register. These registers 1201 and 1202, function as leading edge detectors also required are six bit data shift registers 1203 and 1204. The leading edge detectors sampling at 16 times the data bit rate, are used to detect data on the line. A divide by 16 counter 1205 is used to generate the RX CLK. This counter is initialized each time a data bit of a minimum of 216XCLK periods wide is detected on either the RXA or RXB input. The output of the edge detector shift register is latched at counter states four and five. The RX CLR is generated at the counter state eight high to low transition for one 16XCLK period. The delay of the RX CLK with respect to positive edge of RXADEL or RXBDEL signals can vary from 9 to 16 16 XCLK periods depending on the position of the next position edge at RXADEL or RXBDEL signals. The RX CLK shifts NRZA and NRZB data bits into the six bit data shift registers. The outputs of the 6 bit shift registers are continually compared with sync detect with or without data and zero substitution patters. When a valid sync is detected, the signal SYNC DETECT W/DATA or SYNC DETECT W/O DATA is output to the Receive Frame Processor. When a B6ZS pattern is detected, the ZSUBDET signal enables decimal 6 counter 1206. Both 6-bit data shift register outputs are replaced by zero until counter 1206 reaches to six. The output of shift registers 1203 and 1204 are ORed together to generate RXNRZD. The wide pulse is generated for RXA or RXB signal input wider than 37 16XCLK period.

Figure 13:
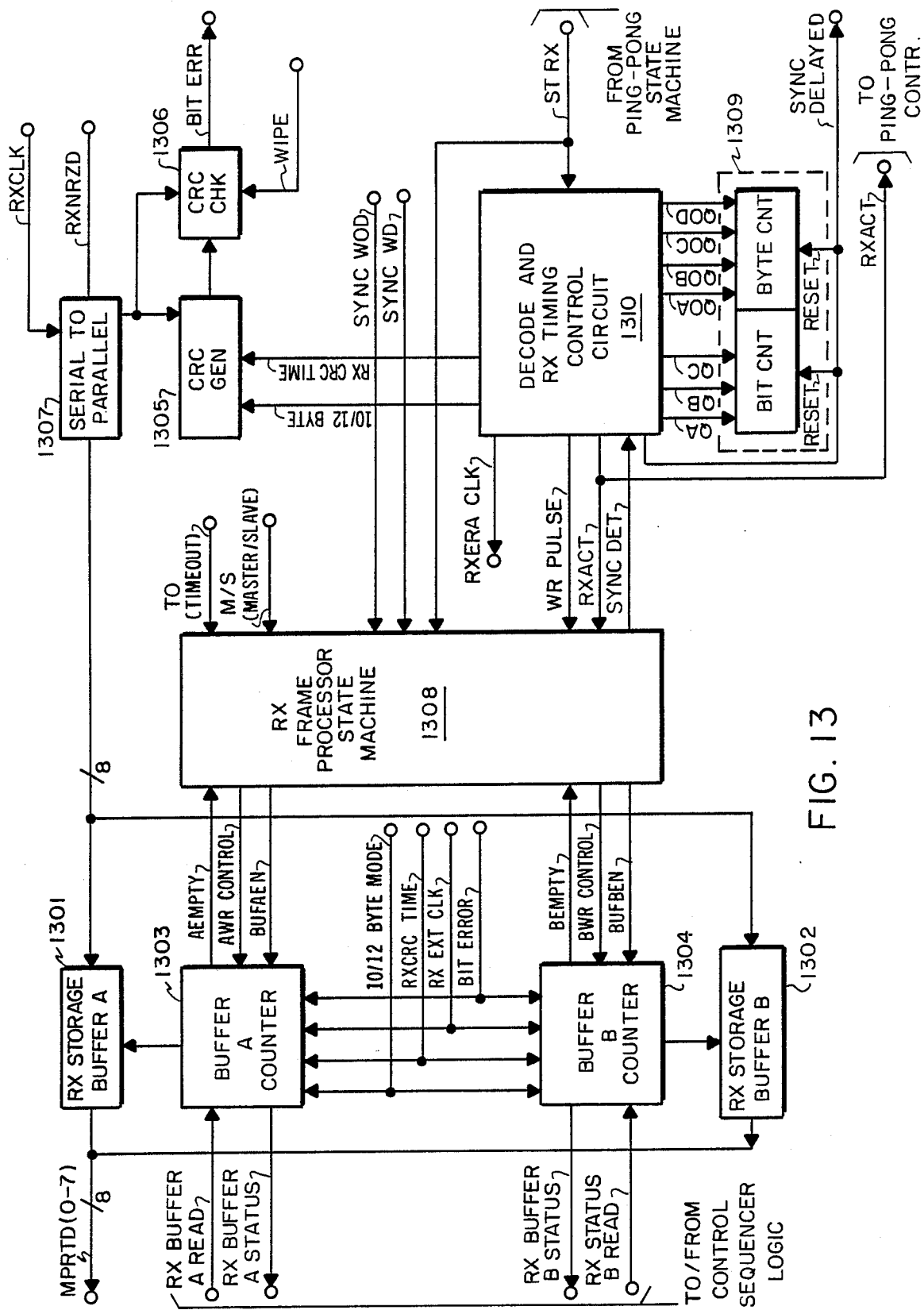
FIG. 13 of the accompanying drawing is a block diagram of the RX Frame Processor of FIG. 1.

Referring now to FIG. 13, there the receive frame processor of the present invention is shown. This processor consists of two storage buffers 1301 and 1302, two buffer counters 1303 and 1304, CRC generate and compare logic 1305 and 1306, serial to parallel shift register 1307, frame processor state machine 1308, bit-/octet counter 1309 and decode and RX Timing Control Circuit 1310. The receive frame processor converts the RX NRZ serial data from the receive bit processor into octet parallel data, checks the CRC character, and enters the mini-packets into the storage buffers. The receive frame processor functions as follows:

1. Sync detect (SYNC WOD or SYNC WD) is received from the receive bit processor.
2. Four RX bit times later the first data bit is available on the serial line (RX NRX Data).
3. After eight data bits have been clocked into the shift register the data is transferred into one of the storage buffers. If both of the buffers are full the data is ignored and the overrun Error is generated.
4. If a buffer is available, each octet of data is written into the buffer as it becomes available.
5. When the entire information field has been written into the buffer and the CRC has been checked, the buffer full flag will be set if the CRC character did not contain an error.

The control functions of the receive frame processor are split into frame timing functions and buffer management. The frame timing functions are accomplished by the bit/octet counter circuit. The outputs of the octet counter are decoded to generate the CRC time signal. CRC time is true for one octet time after the last bit time of the information field. At the end of the CRC time the write pulse output and CRC time output are disabled. RX EXTRA CLK pulses (two) are generated only for 10 byte mode.

Figure 14:
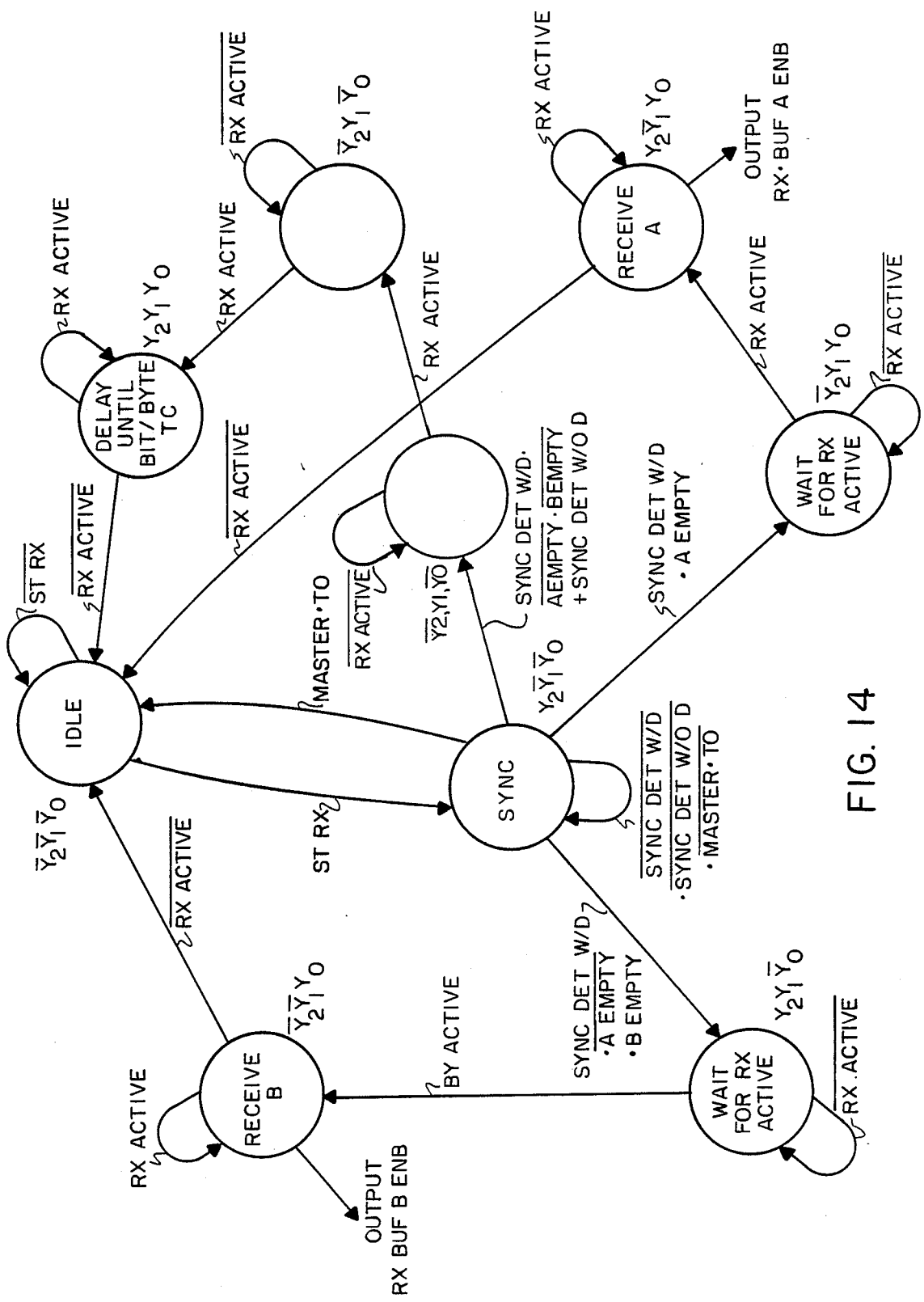
FIG. 14 of the accompanying drawing is a state diagram of the RX Frame Processor of FIG. 1.

The receive Frame Processor Control State Machine provides the buffer management functions. In FIGS. 14 and 15 the state diagram and equations which define the operation of the Frame Processor State Machine 1308 are shown. RX state machine state changes from IDLE STATE to SYNC HUNT state only after receiving STRX signal from the ping-pong state machine. If it is the master and a TO occurs it goes back to the idle state. If it is the slave, it stays at the SYNC HUNT State until it receives a SYNCWD or a SYNCWOD signal. If both the A and B buffers are full and the SYNCWD signal is detected, it outputs a RXOVRNPULSE (RX over run pulse) and changes its state to STATE #2. Detection of SYNCWOD also changes the SYNCHUNT state to STATE #2. The state machine stays at STATE #7 as long as the RX ACTIVE signal is true. Nothing will be written into the A or B RX Buffers. At the SYNC HUNT state if the SYNCWD signal is detected and the RX Buffer A is empty, the incoming data will be written into the RX Buffer A and the RX Buffer A ENB signal will be generated. At the SYNC HUNT state if the SYNCWD signal is detected and the RX Buffer A is full and the RX Buffer B is empty, the incoming data will be written in to the RX Buffer B and the RX Buffer B Enable signal will be generated.

Referring now to FIG. 16, the Transmit Bit Processor of the present invention is shown. This processor consists of a six-bit shift register 1601, a three-bit control register 1602, a zero detect circuit 1603 and a toggle flip-flop 1604 which generates the alternate mark inversion signals. After the start transmit signal is output by the ping-pong controller, the sync character is loaded into the six-bit data register. The transmit TX NRZD data is serially shifted through the data register immediately following the sync character. The output of the 6 bit shift register provides the data to the output pins TXA and TXB. If the zero detect logic has detected six consecutive zeros in the data register, the bipolar six zero substitution (B6ZS) pattern is loaded into the data register.

The three bit control register controls the toggle flip flop which steers the data output pulses to the TXA or TXB output pins. The load sync and zero detect signals load the the control register with the patterns of rule violations required for the sync characters and the zero substitution pattern.

Figure 17:
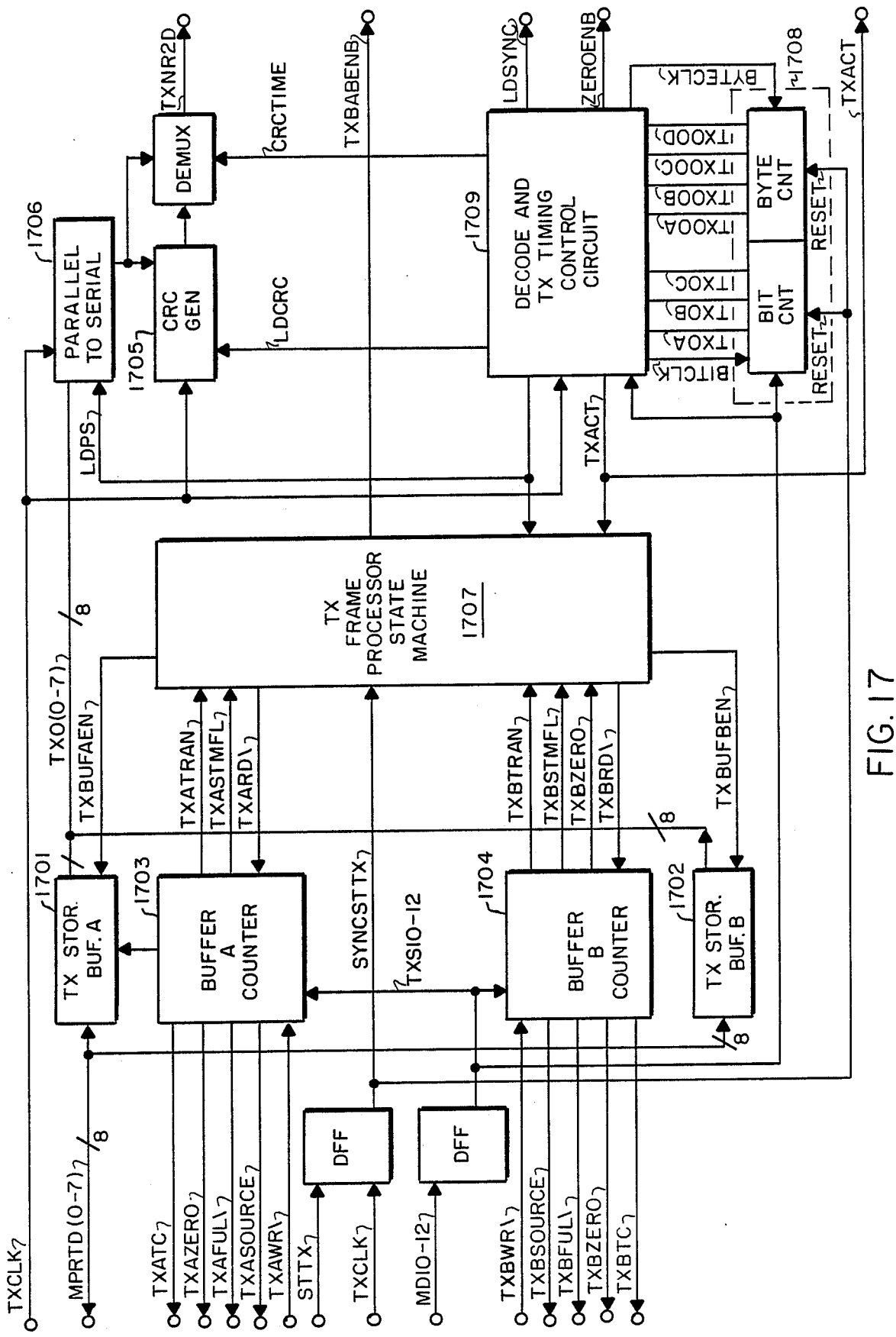
FIG. 17 of the accompanying drawing is a block diagram of the TX Frame Processor of FIG. 1.

Referring now to FIG. 17, the transmit frame processor of the present invention is shown. This processor consits of two storage buffers 1701 and 1702, two buffer counters 1703 and 1704, a CRC generator 1705, a parallel to serial shift register 1706, a Transmit Frame Processor state machine 1707, a bit/octet counter 1708 and decode and TX and timing control circuit 1709.

The control functions of the transmit frame processor are divided into two sections. The TX Frame processor state machine implements the buffer management. The bit/octet counters control the timing functions.

After the start transmit (ST TX) signal is received from the ping-pong controllers, the TX bit counter is started, the TX active signal is turned on and the CRC generator is cleared.

If there is a minipacket available to transmit, the parallel to serial (P/S shift register is loaded from a transmit storage buffer one octet at a time).

The counter chain outputs a load pulse every eight TX bit times until all of the information field has been loaded into the shift register. When the last information bit has been shifted out of the shift register, the output of the CRC generator is enabled. Eight TX bit times later, the output of the CRC generator is disabled and the TX active signal is reset. The state machine provides the buffer management function as follows:

1. IDLE STATE: If neither storage buffer is full, the P/S shift register is cleared and fill packet (no data) is sent. If only one TX buffer is full, the full buffer will be serviced. If both TX buffers are full, and only one contains a transparent packet, TX buffer with the transparent packet will be serviced first. If both buffers are full and both contain the same type of data (transparent or nontransparent) TX buffer A will be serviced first.
2. After Transmit A is completed, if TX buffer B is not Zero (partially full) or full, state machine changes its state to B NEXT state or otherwise goes to IDLE STATE.
3. B NEXT STATE: After receiving the ST TX signal from the ping-pong controller if only one buffer is full, that buffer will be serviced first. If both TX buffers are full and only one contains a transparent packet, the TX buffer with the transparent packet will be serviced first. If both TX buffers are full both contain the same type of data (transparent or non-transparent) TX buffer B will be serviced first.

The state diagram and logic equations defining the operation of the Transmit Frame Processor are shown in FIGS. 18 and 19, respectively.

The MPRT is an LSI circuit which is packaged in a 40 pin dual in line package. The pinout diagram for this package is shown in FIG. 20. A description of the signals appearing at the pins of that package is provided below:

| TRANSPARENT PROCESSOR INTERFACE | |
|---|---|
| TDO-7 | Transparent Data I/O Bus |
| TO2 | Transparent Microprocessor Phase Two Clock Input |
| TSEL— | Transparent Bus Select Input (active low) |
| TAO | Transparent Address Zero Bit Input |
| TR/W | Transparent Read Write Control Input (Write is active low) |
| TMPA— | Transparent Mini Packet Available Output. A transparent mini packet is available to read from an MPRT RX Buffer (active low) when either RX Buffer A or RX Buffer B is full with a transparent packet and Space available (TSA) is not asserted. It is reset on the read of the first data octet of the receive packet. |
| TSA— | Transparent Space Available Output Pin. A TX Buffer is available to be written into. Active low when either TX Buffer A or TX Buffer B is empty and Transparent Space available Interrupt Enable (TSAIE) is set and TMPA is not asserted. It is reset either when TSAIE is reset or the first octet of the packet is written to the Transparent Data register. |

| NON-TRANSPARENT PROCESSOR INTERFACE | |
|---|---|
| NTDO-7 | Non-Transparent Data I/O Bus |
| NTO2 | Non-Transparent Microprocessor Phase Two Clock Input |
| NTSEL— | Non-Transparent Bus Select Input (active low) |
| NTAO | Non-Transparent Address Zero Bit Input |
| NTR/W | Non-Transparent Read Write Control Input (write is active low) |
| NTMPA— | Non-Transparent Mini Packet Available Output. A non-transparent mini-packet is available to be read from an MPRT RX Buffer active low) when either RX Buffer A or RX Buffer B is full with a non-transparent packet and NTSA is not asserted. It is reset on the read of the first data octet of the receiver packet. |
| NTSA— | Non-Transparent Space available Output. Active low when there is a TX Buffer is available and the Non-transparent Interface Space Available Interrupt (NTSAIE) Enable is set and NTMPA is not asserted. It is reset on the first octet of a packet is written to the Non-Transparent Data register or NTSAI is reset. |
| ERROR- | MPRT Error Output Pin. An MPRT error condition exist. Active low when either a Sync Error or CRC Error or Receive Overrun Error occurred. Sync Error is generated after 128 times occurrence of the Time Out when MPRT is functioning as master. In the Slave mode, ERROR pin is reset to low if a sync character is not detected for consecutive 512 TCLK period. |

| SUBSCRIBER LOOP LINE DRIVER INTERFACE | |
|---|---|
| RXA, RXB | Receiver Serial Input A and B. The MPRT receives positive and negative binary data from the line Driver Circuit through RXA and RXB inputs. |
| TXA, TXB— | Transmit Serial Outputs A and B. The MPRT transmits, positive and negative RZ signals of the bipolar signal to the Line Driver through TXA and TXB-TXB - is active low. |
| TX/RX | Transmit Receiver Output Pin At half duplex mode of operation of the MPRT, this pin is high when it is transmitting and low when it is receiving. At full duplex mode of operation of the MPRT, this pin is low. |

| MISCELLANEOUS | |
|---|---|
| OSC IN | Oscillator or Clock Input. |
| OSC OUT— | Oscillator or Clock-Output Signal |
| BR CLK IN | Baud Rate Clock Input. |
| RESET- | Reset-Input Asynchronous MPRT direct reset input signal. |
| VDD | Power Supply +5 Volt Input |
| VSS | Power Supply Ground Input |

It will be obvious to those skilled in the art that numerous modifications of the present invention can be made without departing from the spirit of the invention which shall be limited only by the scope of the claims appended hereto.

What is claimed is:

1. A transmitter-receiver circuit for use in a communication system including a first and a second microprocessor and a digital subscriber loop circuit, each operated to send and receive digital information, said first microprocessor is operated to send and receive voice information and said second microprocessor is operated to send and receive data information;
   said transmitter-receiver circuit connected between said digital subscriber loop circuit and said microprocessors; and comprising a transparent register connected to said first microprocessor and operated to store said voice information, and a non-transparent register connected to said second microprocessor and operated to store said data information;

said transmitter-receiver circuit operated to transmit alternating send and receive frames of said information of predetermined size between said digital subscriber loop circuit and said microprocessors, said transmitter-receiver circuit also operated to transmit said alternating send and receive frames in a ping-pong protocol and to encoded it in an alternate mark inversion format;

said digital information including a clock signal and a sync character, said transmitter-receiver circuit further comprising:

a transmit bit processor and a receive bit processor, each connected to said digital subscriber loop circuit;

said receive bit processor operated to extract said clock signal, detect said sync character and convert said alternate mark inversion information to non-return-to-zero information;

said transmit bit processor operated to convert non-return-to-zero information to alternate mark inversion information after inserting a clock signal and a sync character into each frame of such information.

2. A transmitter-receiver circuit as claimed in claim 1, wherein said transmitter receiver circuit further comprises:

a receive frame processor connected to said receive bit processor and operated to convert said non-return-to-zero data into octets of parallel data; and a transmit frame processor connected to said transmit bit processor and operated to convert octets of parallel data into said non-return-to-zero data.

3. A transmitter-receiver circuit as claimed in claim 2, wherein said transmitter-receiver circuit further comprises:

a transparent interface processor connected to said transparent register and said receive frame processor and operated to transmit said parallel octets of data between said transparent register and said receive frame processor; and a non-transparent interface processor connected to said non-transparent register and said transmit frame processor and operated to transfer said parallel octets of data between said non-transparent register and said transmit frame processor.

4. A transmitter-receiver circuit as claimed in claim 3, wherein said transmitter-receiver further comprises:

a ping-pong controller connected to said transmit and receive bit and frame processors and said transparent and non-transparent interface processors, and operated to control alternate sending and receiving of subscriber loop transmit and receive frames.

* * * * *